Patented Apr. 15, 1947

2,419,027

UNITED STATES PATENT OFFICE 2,419,027

PRODUCTION OF CADMIUM SELENO-CYANIDE

Ludwig F. Nerlinger, Marshallton, Del., assignor to E. I. du Pont de Nemours & Company, Wilmington, Del., a corporation of Delaware No Drawing. Application October 11, 1945,
Serial No. 621,857

7 Claims. (Cl. 23—77)

This invention relates to the technology of cadmium and more particularly to a novel process for the production of a complex cadmium compound containing selenium.

The chemistry of cadmium is well known but due to the fact that cadmium does not occur in minerals in a high concentration, the industrial uses have been somewhat limited. It has been adopted for the plating of metal to give a bright finish and also to prevent rusting of the ferrous base on which it is plated. A second use is in the manufacture of cadmium pigments and these include the cadmium yellow pigments which comprise cadmium sulphide and the cadmium red pigments which comprise cadmium sulphoselenide. In addition, basic cadmium compounds have been proposed as useful in the modification of the properties of other pigments and particularly titanium oxide. Cadmium oxide, hydroxide and carbonate have been proposed for this purpose.

Selenium, while somewhat similar to sulphur in chemical behavior, has not found wide usage in industry. It is used as a metal in photometry, in glass to eliminate the green tint due to iron, and also for the production of red or ruby glass. It is also used in the production of cadmium red pigments as referred to above.

This invention has as an object a new process for the preparation of a new precipitated compound comprising cadmium and selenium. A further object is the production of a water-insoluble compound of cadmium and selenium which is useful in the pigment industry. Still further objects will become apparent from the detailed description of the process which follows:

A broad embodiment of this invention comprises the dissolving of selenium in an inorganic cyanide salt solution and thereafter reacting the resulting seleno-cyanide salt solution with a solution of cadmium salt. A precipitate thus formed possesses novel properties and is found to be cadmium seleno-cyanide analyzing about 35% cadmium and about 49% selenium.

Selenium has been found to be very soluble in solutions of inorganic cyanides and particularly the alkali metal cyanides and alkaline earth metal cyanides. Sodium and potassium cyanides are of particular interest and preferred for use, due to their ready commercial availability, moderate cost, and ability to afford optimum results hereunder. Alkaline earth metal cyanides, either alone or admixed with alkali metal, though utilizable herein, are less preferred because they present some complications due to the insolubility of the alkaline earth sulphates which may be encountered in the process when a cadmium sulphate solution is reacted with a cyanide solution containing calcium, barium or strontium. For this reason, the use of an alkali metal (sodium, potassium, lithium) cyanide and particularly sodium cyanide (the least expensive and most attractive commercially) is preferred. Accordingly, its use will be stressed in the detailed description of the process, although, as indicated, the invention is not to be construed as limited thereto.

Solutions of the seleno-cyanides are quite stable and they result from the addition of elementary selenium to solutions of sodium cyanide as well as the other alkali and alkaline earth metal cyanides mentioned. The Se:CN ratio of the reactants is relatively constant for all cyanide concentrations up to saturation. The ordinary selenium of commerce may be added to a relatively concentrated solution of sodium cyanide which contains as much as 450 grams of NaCN per liter and any excess of selenium may be removed. A slight excess of selenium as the $Cd(SeCN)_2$ subsequently to be formed is somewhat soluble in excess CN. A preferred concentration has been found to be 747 grams of elemental selenium dissolved at room temperature in one liter of NaCN solution containing about 480 g. of NaCN. (Se:NaCN ratio=.993). The resulting solution will contain, as noted, NaSeCN, and the ratio of selenium to NaCN will be found to approach unity, with analyses ranging from .97 to .993 atom of selenium per molecule of NaCN. As indicated, the higher ratio values are the more desirable, due to the fact that excess sodium cyanide may lower the yield of the cadmium seleno-cyanide due to its solubility in cyanide solutions.

The seleno-cyanide solution as prepared above is reacted with a solution of a cadmium salt such as cadmium sulphate or cadmium chloride or nitrate. These solutions are well known in the art and the presentation of details of their manufacture is unnecessary at this time. Upon admixture, cadmium seleno-cyanide appears as a white, relatively stable precipitate which is readily separated from the supernatant liquid containing sodium sulphate or other soluble salts, depending on the selection of the reagents used. This precipitate is readily recovered by conventional filtration, washing and drying, and is useful in the preparation of improved pigmenting materials or as a source of selenium in the preparation of valuable selenium compounds. As disclosed in my co-pending, concurrently-filed application, Serial No. 621,858, my novel cadmium-seleno-cyanide compound, when calcined in the presence of other cadmium compounds, particularly the oxide or carbonate, affords production of improved types of high-quality cadmium-selenide pigments, ranging in color from maroon to dark red to light red to reddish orange colors.

The following examples are given as illustrative of the process but are not to be regarded as limitative, it being evident that many modifications may be made in the process of this invention without departing from its underlying principles and concept:

*Example I*

480 parts by weight of commercial sodium cyanide (97% NaCN) were dissolved in 1000 parts by weight of water and to this solution 750 parts by weight of selenium were added. The resulting mixture was stirred for six hours and analysis showed that the solution contained about .993 mole of selenium for each mole of sodium cyanide present in the original solution. The resulting sodium seleno-cyanide solution was clarified by filtration and then mixed with a cadmium sulphate solution containing 980 parts by weight of cadmium sulphate and analyzing 440 grams $CdSO_4$ per liter. Reaction took place on the mixing of the two solutions and the white precipitate was found to be cadmium seleno-cyanide $Cd(SeCN)_2$ or a cadmium compound containing two atoms of selenium for each atom of cadmium. The product was filtered and washed to remove soluble salts, after which it was dried.

*Example II*

A sodium seleno-cyanide solution containing 4.17 pounds selenium per gallon and the equivalent of 2.6 pounds of sodium cyanide per gallon was prepared by dissolving commercial selenium in a concentrated solution of sodium cyanide. A slight excess of selenium was used in the process and the excess removed along with impurities by a filtration operation. Three volumes of a cadmium sulphate solution containing two pounds of cadmium per gallon were then mixed with two volumes of this sodium seleno-cyanide solution within a suitable agitated container. A white precipitate resulted from the mixing operation and this was recovered by filtration and drying. This analyzed 34.6% cadmium and 48.9% selenium which closely corresponds to a theoretical value for these elements in the compounds $Cd(SeCN)_2$.

The methods outlined above are relatively simple in character and provide novel means for producing a novel, substantially pure compound of selenium and cadmium. The process permits the use of the most inexpensive cyanide, namely, sodium cyanide, and the most inexpensive form of selenium, the selenium of commerce in elementary form. The latter is conveniently dissolved in the former and the concentration of the cyanide solution employed may vary over a relatively wide range, though the more concentrated solutions are preferred for economic reasons. I utilize solutions analyzing from 300 to 500 grams sodium cyanide per liter, and preferably solutions in the more concentrated range of around 450 grams NaCN per liter. The selenium dissolves readily in the cyanide solution and any excess which may have been added is readily removed by a decantation or a filtration operation. Insoluble impurities which may have been present in the selenium are also removed at this time. The thus-clarified solution contains substantially pure sodium seleno-cyanide as the solute with very little excess sodium cyanide. The latter is to be avoided due to the solubility of cadmium seleno-cyanide in the same.

The cadmium salt solution may be cadmium sulphate which is the most available form of soluble cadmium, although any other form of soluble cadmium salt such as the chloride, nitrate, etc., will do equally well. In such instances, again, wide ranges of concentration are employable, the more concentrated solutions being preferable. The cadmium solution may be mixed with the seleno-cyanide solution in any desired manner but it is preferably mixed by simultaneously adding the two solutions to a mixing tank and the reaction mixture is stirred during the addition. Under these conditions, reaction becomes complete in a minimum period of time and a very uniform product results.

I claim as my invention:

1. A process for the manufacture of cadmium seleno-cyanide which comprises dissolving selenium in a solution of an inorganic cyanide salt, reacting the resulting solution with a solution of a soluble cadmium salt, and recovering the precipitated product.

2. A process for the manufacture of cadmium seleno-cyanide which comprises dissolving selenium in a solution of an alkali metal cyanide, reacting the resulting alkali metal seleno-cyanide with a solution of a cadmium salt, and recovering the resulting precipitate.

3. A process for the manufacture of cadmium seleno-cyanide which comprises dissolving elementary selenium in a solution of sodium cyanide and precipitating cadmium seleno-cyanide therefrom by reacting the resulting selenium-containing solution with a solution of a cadmium salt.

4. A process for the manufacture of cadmium seleno-cyanide which comprises dissolving elementary selenium in a solution of potassium cyanide and reacting the resulting seleno-cyanide solution with a cadmium salt solution.

5. A process for producing a cadmium-seleno-cyanide compound which comprises dissolving elementary selenium in a sodium cyanide solution, reacting the resulting seleno-cyanide solution with a cadmium sulfate solution, and then recovering and drying the resulting precipitate.

6. A process for producing a cadmium-seleno-cyanide compound which comprises dissolving elementary selenium in a sodium cyanide solution, reacting the resulting seleno-cyanide solution with a cadmium chloride solution, and then recovering and drying the resulting precipitate.

7. A precipitated cadmium seleno-cyanide compound containing two atoms of selenium for each atom of cadmium.

LUDWIG F. NERLINGER.